United States Patent [19]

Husaini et al.

[11] 4,315,036

[45] Feb. 9, 1982

[54] PROCESS FOR DECAFFEINATING TEA

[75] Inventors: Saeed A. Husaini, Marysville; Richard T. Liu, Worthington, both of Ohio

[73] Assignee: Societe d'Assistance Technique pour Produits Nestle S.A., Lausanne, Switzerland

[21] Appl. No.: 868,938

[22] Filed: Jan. 12, 1978

[51] Int. Cl.³ .............................................. A23F 3/38
[52] U.S. Cl. ................................. 426/387; 426/422; 426/427; 426/428; 426/597; 426/495
[58] Field of Search .............. 426/597, 427, 428, 387, 426/422, 495

[56] References Cited

U.S. PATENT DOCUMENTS

| | | | |
|---|---|---|---|
| 2,181,549 | 11/1939 | Grethe | 426/597 |
| 2,963,368 | 12/1960 | Greenbaum et al. | 426/597 X |
| 3,065,077 | 11/1962 | Mishkin et al. | 426/597 |
| 3,151,985 | 10/1964 | Fobes | 426/597 X |
| 3,163,539 | 12/1964 | Barch | 426/597 X |
| 3,787,590 | 1/1974 | Borders et al. | 426/597 X |
| 3,950,553 | 4/1976 | Gasser et al. | 426/597 X |
| 3,959,497 | 5/1976 | Takino | 426/597 X |
| 4,031,251 | 6/1977 | Margolis et al. | 426/427 X |

FOREIGN PATENT DOCUMENTS 397323  8/1933  United Kingdom ................ 426/428

OTHER PUBLICATIONS

Sanderson, The Practice of Instant Tea Manufacture, *World Coffee & Tea*, Apr. 1972, pp. 54-57.
Punnett, What Causes Clouding in Iced Tea? Tea & Coffee Trade Journal, May 1956, pp. 17, 86, 87.

*Primary Examiner*—Joseph M. Golian
*Attorney, Agent, or Firm*—Vogt & O'Donnell

[57] ABSTRACT

An aqueous extract of tea, containing native tea tannins and caffeine, is cooled to provide an aqueous solubles phase containing cold-water soluble components of the extract, including a minor portion of the caffeine, and an insolubles phase containing tea tannins complexed with a major portion of the caffeine. The aqueous solubles phase is separated from the insolubles phase, and the latter is subjected to decaffeination to provide decaffeinated tannins which may then be recombined with the aqueous solubles phase. The resulting treated extract from which the major portion of the caffeine has been removed can be dried or, if desired, subjected to further decaffeination and thereafter dried to provide a cold-water-soluble decaffeinated tea. Further features of the invention are set forth in the following description.

13 Claims, No Drawings

PROCESS FOR DECAFFEINATING TEA

BACKGROUND OF THE DISCLOSURE

1. Field of the Invention

This invention relates to decaffeinating aqueous extracts of tea and to the resulting tea product.

2. Description of the Prior Art

During the enzymatic oxidation of green tea leaves (commonly referred to as "fermentation"), a number of substances, collectively referred to as "tannins", are produced. Fermentation for extended periods will provide the maximum amount of tea tannins; partial fermentation will provide only a portion of the tannins which a given tea is capable of producing. Also, aqueous tea extracts can be oxidized in the manner described in U.S. Pat. No. 2,863,775 to provide increased tannins content.

Tea tannins, including those that are soluble and those that are partially or wholly insoluble in cold water, are largely responsible for the characteristic astringency of tea and constitute a significant portion of soluble tea solids. They thus constitute a desired part of a commercial tea product, be it in the form of a full strength brew, concentrated aqueous extract or dry soluble powder.

U.S. Pat. No. 2,963,368 describes a process for preparing a cold-water-soluble tea extract from which a portion of the caffeine and tannins have been removed. According to that process, a concentrated tea extract is cooled, thereby precipitating the insoluble tea tannins complexed with an unspecified quantity of the caffeine present in the extract. The insoluble complex is removed from the remaining portion of the extract by centrifugation or other mechanical means and is never restored, resulting in a disclosed loss of about 10% of the tea solids, including the tannins. Thereafter a solubilizing or suspending agent is added to the centrifuged extract to maintain the remaining caffeine and tannins in solution or suspension. This procedure of discarding a substantial portion of the tannins is not only disadvantageous from the standpoint of the quality and flavor of the decaffeinated extract (since tea tannins contribute significantly to the organoleptic profile of the product), but it is also unnecessarily wasteful of economically valuable tea solids. Moreover, the finished product contains an additive not found naturally in tea (gum, glycerol, etc.).

SUMMARY OF THE INVENTION

This invention provides a process for decaffeinating tea extracts to any desired extent, without appreciable loss of valuable tea solids other than caffeine. The invention also provides decaffeinated tea extract which is, if desired, of substantially undiminished tannins content, or which can contain more or less tannins than the extract from which it is prepared.

The process of the invention comprises the steps of (a) cooling an aqueous tea extract, containing caffeine and tannins, sufficiently to form (i) an aqueous solubles phase, containing cold-water soluble components of the cooled extract, including a portion of the caffeine, and (ii) an insolubles phase containing a cold-water-insoluble complex of tannins with another portion of the caffeine;

(b) separating the solubles phase from the insolubles phase;

(c) treating the insolubles phase to remove caffeine therefrom; and (d) adding decaffeinated tannins to the solubles phase to provide a tea extract from which a portion of the caffeine has been removed.

Desirably, the tea extract is first concentrated to increase its solids content. Extract solids contents up to about 25% or above are suitable. It is also desirable to remove volatile aroma and flavor constituents from the extract, suitably by known stripping methods, before practicing the process of this invention.

The aqueous tea extract is cooled to precipitate a major portion of the caffeine contained in the extract in the form of tannins-caffeine complex. The extract is preferably cooled so that about two-thirds of the caffeine originally present in the extract is precipitated in the form of a complex, while about one-third of the caffeine remains in solution in the extract. The tannins-caffeine complex is then separated and subjected to decaffeination to provide decaffeinated tannins, which are subsequently returned to the tea extract. A tea extract is thereby obtained from which about two-thirds of the caffeine has been removed, while the original tannins content is essentially undiminished.

If desired, the described process may be repeated one or more times, in order to achieve further decaffeination of the extract. Additionally, or alternatively, the solubles phase may be decaffeinated, suitably by known means, to reduce further the caffeine content of the ultimate product.

The tannins which are originally present in the aqueous tea extract include both cold-water-soluble tannins and cold-water-insoluble tannins. (As utilized herein, "hot" refers to temperatures between about 60° and about 200° C., and "cold" refers to temperatures between about 0° to about 15° C.) Upon cooling the tea extract, an insolubles phase is formed which contains cold-water-insoluble tannins, together with caffeine which has complexed with cold-water-soluble tannins and/or cold-water-insoluble tannins. The relative proportion of these three components can vary according to temperature, the caffeine content of the tea extract and the character of the tannins. Decaffeination of the insolubles phase results in decomplexing of the tannins-caffeine complexes and liberation of cold-water-soluble and cold-water-insoluble tannins.

In a further embodiment of this invention, decaffeinated tannins (both cold-water-soluble and cold-water-insoluble) from the insolubles phase are added to the solubles phase, and the mixture is again chilled in order to complex and remove a further amount of caffeine from the extract solubles phase. The insolubles are then decaffeinated, and the liberated tannins may again be added to the extract solubles phase, either to restore the tannins content or for the purpose of again repeating the decaffeination process, as may be desired. During any repetition of the described process, the solubles phase may be separately treated by prior art or other means to further reduce its caffeine content.

When the desired degree of decaffeination has been achieved, the volatiles are readded (if they were earlier removed), and the extract may then be dried or suitably stored. Upon reconstitution by addition of an appropriate amount of water, a flavorful decaffeinated tea beverage, suitable for use either hot or cold, is obtained. Alternatively, one may restore only the cold-watersoluble tannins to the tea extract, in which event a haze or cloudiness is not present upon reconstitution of the tea extract with cold water or addition of ice.

The process of the present invention offers many advantages over the prior art. In particular, only native tea components, i.e., tannins, are employed to precipitate the caffeine from the tea extract, thereby preserving the natural and desirable characteristics of the extract. Moreover, by virtue of the present invention, the tannins content of the original tea extract can be restored to its original value (or other desired value), thereby eliminating both the organoleptic and economic losses associated with prior art processes.

Furthermore, the caffeine is precipitated from the tea extract by simply cooling the extract to complex the caffeine with the tannins. It is only this complex which is then treated with a decaffeinating medium, rather than the entire tea extract. In addition, since the caffeine is now concentrated in a considerably reduced volume, decaffeination is accomplished with greater ease and efficiency than when the entire extract is treated, and substantially lesser quantities of decaffeinating medium are required. This, of course, is economically highly desirable.

Additionally, as only the insoluble tannins-caffeine complex is treated with the decaffeinating medium, the flavor and aroma constituents which remain in the extract solubles phase are never contacted with the decaffeinating medium. This avoids loss or alteration of these desirable constituents, in contrast to prior art processes which contact a decaffeinating medium with the entire extract, thereby removing not only the caffeine but also some portion of these flavor and aroma constituents.

DESCRIPTION OF THE PREFERRED EMBODIMENTS

In accordance with the invention, a hot-water extract of tea is first prepared. This tea extract includes, among other constituents, cold-water-soluble tannins, cold-water-insoluble tannins and caffeine.

The tea which is used to prepare the extract in accordance with the present invention is at least partially fermented. Thus, an extract made with green tea which has not been fermented will not contain a substantial amount of tannins with which the caffeine can complex to form the desired tannins-caffeine complex. In addition, those tannins which are present in the green tea are not capable of effectively complexing to a substantial degree with caffeine. Consequently, it is preferable to ferment the green tea at least partially, or to oxidize the extract by means well known to those in the art. By oxidation of the green tea extract, a suitable quantity of tannins which are capable of complexing with caffeine can be obtained.

The extract is prepared by conventional techniques, exemplary of which are multistep countercurrent and slurry extractions. These techniques normally involve leaching of fermented tea leaves with hot water. Depending upon the particular extraction technique employed, the solids concentration of the resultant extract will range from about 1% to about 10% solids by weight, usually about 2-3%.

The tea extract also contains important aroma and flavor constituents which are susceptible to alteration or loss during processing, and it is advantageous to minimize their exposure to adverse conditions. These constituents, termed "volatiles" or "aromatics", are therefore desirably separated at the outset and recombined at the end of the process, in accordance with well known procedures, in order to prevent their loss or alteration. The volatiles are isolated by, for example, stripping the extract with steam at a temperature of from about 80° to about 120° C., and condensing and cooling the volatiles-laden effluent stream to provide a stable isolate of these important fractions. The isolate is later restored to the tea to provide a full-flavored beverage product.

The tea extract is then desirably adjusted to a standard concentration, suitably about 5% to about 25% solids, preferably about 8% to about 10% total solids by weight. The solids content can be increased by vacuum evaporation, freeze concentration or other known means.

The concentrated aqueous extract is then cooled to between about 0° and about 15° C., preferably from about 8° to about 10° C. The resulting solubles and insolubles phases are separated by decanting, filtration, or other suitable means, centrifugation being preferred. The aqueous solubles phase generally contains about 65% of the total tea solids and includes a minor proportion of the caffeine. The proportion of caffeine removed from the aqueous extract as a precipitated complex is related to the tannins content of the tea extract and the temperature to which the extract is chilled; in general, the greater the proportion of tannins in the extract, the greater will be the proportion of caffeine which is precipitated.

Following separation of the solubles and insolubles phases of the cooled concentrated tea extract, the insolubles phase is subjected to decaffeination by any desired means. Known and conventional means using a chlorinated hydrocarbon solvent such as methylene chloride, trichlorethylene or the like as the decaffeination medium may be employed. Preferably, a liquid, water-immiscible fatty material is used, as disclosed in commonly assigned German patent specification No. 2548916, the disclosure of which is incorporated by reference herein. It has been observed that the tannins-caffeine complex is relatively stable, and it is accordingly desirable to employ decaffeination conditions and/or a number of repetitive decaffeination cycles which will achieve substantially complete (or other desired degree) of decaffeination of the complex.

To facilitate the liberation of the caffeine from the tannins-caffeine complex, the complex may be treated by known methods to oxidize the tannins component of the tannins-caffeine complex as described in U.S. Pat. Nos. 3,151,985 or 3,950,553 (the disclosures of which are hereby incorporated by reference). This oxidation treatment destroys or impairs the ability of the tannins to remain complexed with the caffeine thereby promoting the ease of subsequent decaffeination. Furthermore, this oxidation treatment also renders the cold-water-insoluble tannins, which are complexed with the caffeine, soluble in cold water after their liberation from the complex by decaffeination. Accordingly, oxidation may be desirable not only to promote ease of decaffeination, but also to solubilize the cold-water-insoluble tannins. The absence of insoluble tannins avoids a cloudy appearance in the final beverage product when the beverage is consumed cold. As the tannins may be darkened as a result of this oxidation treatment, it may be desirable to bleach them by known means such as those described in the U.S. patents referred to above.

The oxidation treatment, by destroying or impairing the ability of the tannins to complex with caffeine, causes the tannins so treated to be no longer useful for further removal of caffeine from the extract solubles phase. Accordingly, it is preferable not to oxidize the tannins in those instances where it is desired to use the decaffeinated tannins for further caffeine removal from the extract solubles phase. Where, however, no such further use of the decaffeinated tannins is intended, e.g., where they are obtained in the last stage of a sequentially-staged decaffeination treatment and are to be added to the final decaffeinated extract, or where they are, for other reasons, not to be used to remove additional caffeine from the extract solubles phase by precipitation, oxidation may be a convenient and desirable means of promoting ease of decaffeination.

Following decaffeination of the insolubles phase, decaffeinated tannins (both cold-water-soluble and cold-water-insoluble) are separated from the caffeine-laden decaffeination medium and are added to tea extract—which can be the same solubles phase with which they were previously associated, or another tea extract, or tea extract from which tannins-caffeine complex has been removed. The decaffeinated tannins may be added to the solubles phase at ambient temperature or below, preferably at about 10° to 20° C., or the aqueous solubles phase can be warmed either before or after the tannins additives to a temperature of about 35° to 50° C., preferably avoiding elevated temperatures which cause deterioration of the final product flavor. If the aqueous solubles phase is warmed, the temperature should desirably be such that all of the added tannins are substantially dissolved therein. However, even if the tannins are not all dissolved in the aqueous solubles phase, i.e., the temperature is such that the cold-water-insoluble tannins are not dissolved, caffeine precipitation will take place nevertheless. This totally unexpected phenomenon represents a significant cost savings as it is not necessary to warm the solubles phase to dissolve the cold-water-insoluble tannins in order for these tannins to complex with caffeine. Simple mixing to form a dispersion is sufficient for the cold-water-insoluble tannins to complex with caffeine. The efficiency of forming the complex is improved, however, when the solubles phase is warmed.

Additional tannins-caffeine complex is precipitated upon recombination of decaffeinated tannins with the solubles phase and again cooling as above described. The precipitate is separated from the solubles portion of the extract, decaffeinated, and if desired, again recombined with tea extract solubles to provide an extract of still lower caffeine content. Repetition of this procedure will result in further removal of incrementally smaller amounts of caffeine.

Removal of caffeine from the solubles phase may optionally be accomplished by other means. For example, decaffeinated tannins obtained from another tea extract or aliquot may be added to the aqueous solubles phase, which is then cooled to remove additional caffeine as a precipitated tannins-caffeine complex. A quantity of decaffeinated tannins may thus be prepared and added in aliquots to successive aqueous solubles phases of a tea extract for the purpose of decaffeination. Recovery of the tannins-caffeine complex will substantially replenish the reserve of decaffeinated tannins. A mixture of cold-water-insoluble and cold-water-soluble tannins is obtained upon decaffeination of the tannins-caffeine complex. The decaffeination breaks up the complex to liberate both types of tannins. This mixture can be used for further decaffeination of tea extract, however the efficiency of this process is increased by using the cold-water-insoluble tannins for that purpose and reserving the cold-water-insoluble tannins for addition to decaffeinated extract at the conclusion of the process for the purpose of restoring its ultimate tannins level.

Where it is desired to prepare a dry, soluble powder from the decaffeinated extract, the stripped volatiles may be returned and the extract may be dried according to any of the known and conventional techniques, e.g., spray drying or freeze drying.

Tannins which are not derived from tea are also operative and may be used in the process of the present invention. Thus, tannic acid of sufficient purity may be used. However, in order to preserve to a maximum the natural and desirable characteristics of the tea, it is preferable to use natural tea tannins. The use of such tannins may be desirable to supplementing a tea extract which is poor in tannins content, e.g., a green or partially fermented tea extract.

The following examples, in which all parts and percentages are by weight, are illustrative of the present invention.

EXAMPLE 1

A hot-water extract of fermented tea leaves is prepared in a conventional manner, and volatiles are removed therefrom by steam stripping. The stripped extract, containing about 2.5% solids, is concentrated to about 8% solids by vacuum evaporation.

The concentrated extract is divided into two portions. The first portion is cooled to 7° C., whereupon a precipitate forms. The solubles phase is separated from the insolubles phase by centrifugation. The insolubles phase containing the tannins-caffeine complex having a solids content of about 10 to 15% by weight is then decaffeinated by repeated contact with methylene chloride at a temperature not exceeding 95° C. until about 98% of the caffeine has been removed, whereupon residual solvent is removed by steam stripping.

The decaffeination treatment breaks down the tannins-caffeine complex, thereby liberating both the cold-water-soluble and the cold-water-insoluble tannins therefrom. As illustrated in this and the subsequent Examples, one may use either the entirety of the decaffeinated tannins-containing phase (which includes both cold-water-soluble and cold-water-insoluble tannins) to decaffeinate the concentrated tea extract or the solubles phase, or one may use only that portion of the tannins which is insoluble in cold water while reserving the cold-water-soluble tannins for addition to the decaffeinated extract at the conclusion of the process. The latter procedure is illustrated in this Example.

The decaffeinated tannins-containing phase is cooled to 7° C. and centrifuged to separate the cold-water-soluble tannins fraction from the cold-water-insoluble tannins fraction. The latter is hereinafter referred to for convenience as CIT. The CIT is used to remove caffeine from concentrated tea extract in a three-stage procedure as described below:

Stage A

The CIT fraction is first diluted with water to form a smooth slurry. 8.5 parts (dry weight basis) of CIT are then thoroughly dispersed at room temperature into 210 parts of the second portion of concentrated tea extract prepared as described above. Though the CIT is not dissolved in the extract, it nevertheless is still capable of complexing with the caffeine. The concentrated extract contains (prior to the addition of the CIT slurry) 8% or 16.8 parts solids, including 0.92 part caffeine. The mixture is cooled to 7° C., whereupon a precipitate forms and is removed by centrifugation. The supernatant contains 11.3 parts solids, including 0.3 part caffeine.

Stage B

A further aliquot of 8.5 parts CIT (dry weight basis) is thoroughly mixed at room temperature with the supernatant obtained in Stage A. The mixture is cooled to 7° C., whereupon a precipitate forms and is removed by centrifugation. The resulting supernatant contains 11.22 parts solids, including 0.22 part caffeine.

Stage C

Another aliquot of 8.5 parts CIT (dry weight basis) is thoroughly mixed at room temperature with the supernatant obtained in Stage B. The mixture is cooled to 7° C., whereupon a precipitate forms and is removed by centrifugation. The resulting supernatant contains 11.50 parts solids, including 0.063 part caffeine.

Reconstitution to Initial Tannins Content 5.3 parts (dry weight basis) of the cold-water-soluble tannins separated from the CIT following decaffeination as described above are added to the supernatant obtained in Stage C. The decaffeinated extract now contains 16.8 parts solids, as did the 210 parts of the second portion of concentrated extract prior to decaffeination. About 93% of the caffeine originally present in the extract has been removed.

Previously stripped volatiles are added to the decaffeinated extract, whereupon it can be diluted with hot water to provide a fragrant and flavorful beverage, or made into iced tea. Alternatively, conventional drying techniques may be employed to provide a tea powder reconstitutable upon addition of water. When used to prepare iced tea, the beverage is not cloudy because all of the tannins present are soluble in cold water.

EXAMPLE 2

As indicated in the previous Example, the insolubles phase separated from the tea extract by cooling may be used following decaffeination, without removing the cold-water-soluble tannins, to remove caffeine from tea extract. That procedure is illustrated by this Example.

To 175 parts of concentrated tea extract, prepared as described in Example 1 and containing 8% or 14 parts solids, including 0.77 part caffeine, there are added with thorough mixing 61 parts (containing 5.5 parts solids) of the insolubles phase which has been decaffeinated with methylene chloride, as described in Example 1 (preceding Stage A) at room temperature. The mixture is cooled to 7° C., whereupon a precipitate forms and is removed by centrifugation. The solubles phase contains 11.22 parts solids, including 0.40 part caffeine.

The separated insolubles phase is decaffeinated by repeated contact with methylene chloride at room temperature and then steam stripped to remove residual solvent. 2.78 parts (solids basis) of the decaffeinated material are added to the solubles phase, thereby providing a product containing 14 parts of solids, which is the same solids content the extract had prior to decaffeination. 48% of the caffeine has been removed by this single-stage decaffeination treatment.

The procedure of this Example may be repeated sequentially to remove greater amounts of caffeine, if so desired. When the desired degree of decaffeination has been achieved, the tannins thereafter added to the extract may be oxidized and/or bleached. Volatiles may be recombined and the product may be dried, if desired.

EXAMPLE 3

To 120 parts of the solubles phase prepared as described in the second paragraph of Example 1 (and containing 8.8 parts solids, including 0.37 part caffeine), there are added with thorough mixing at room temperature 61 parts (containing 5.5 parts solids) of the mixture of tannins obtained by decaffeinating the separated insolubles phase with methylene chloride. The mixture is cooled to 7° C., whereupon a precipitate forms and is removed by centrifugation. The resulting solubles phase contains 6.7 parts solids, including 0.15 part caffeine.

The separated precipitate is decaffeinated by repeated contact with methylene chloride and steam stripping to remove residual solvent. It is then added to the solubles phase. About 60% of the caffeine contained in the extract solubles starting material has been removed.

As in the prior Examples, further decaffeination may be effected by repetition of the process until the desired degree of decaffeination has been achieved.

EXAMPLE 4

In this Example, the procedure of Example 1 was carried out except that instead of using methylene chloride to decaffeinate the tannins-caffeine complex, corn oil is used.

Thus, as in Example 1, after a hot-water extract of fermented tea leaves is prepared, the volatiles removed, the stripped extract concentrated and then cooled to 7° C. to form a precipitate, the solubles phase is separated from the insolubles phase by means of centrifugation.

The insolubles phase, containing the tannins-caffeine complex and having a solids content of 30% by weight, was then decaffeinated by repeated contact with corn oil. The decaffeination step took place in a York-Scheibel column which was 6 inches in diameter and 12 feet high. The column was operated in a countercurrent manner with an oil flow rate of 799 cc/min and a tannins-caffeine complex feed rate of 39 cc/min. The contact temperature was maintained at 88° C.

In just one pass through the column, 95% by weight of the caffeine present in the tannins-caffeine complex phase was removed. The oil decomplexed the tannins-caffeine complex thereby liberating both the tannins (cold-water-soluble and cold-water-insoluble) and the caffeine. The caffeine is extracted by the oil while the decaffeinated tannins remain in the tannins stream.

The caffeine-laden corn oil is then subjected to high temperatures—high vacuum sublimation to remove the caffeine therefrom. The oil is then ready for reuse in further decaffeination.

The decaffeinated tannins-containing phase was then used to further precipitate caffeine from concentrated tea extract in accordance with Example 1.

We claim:

1. Process for decaffeinating a tea extract which contains caffeine and tannins capable of complexing with caffeine comprising:
 (a) cooling said extract sufficiently to form
  (i) an aqueous solubles phase containing cold-water soluble components of the cooled extract, including a portion of the caffeine, and (ii) an insolubles phase containing a cold-water-insoluble complex of tannins with another portion of the caffeine;
(b) separating the solubles phase from the insolubles phase;
(c) treating the insolubles phase to remove caffeine therefrom;
(d) adding decaffeinated tannins to the solubles phase; and
(e) repeating steps (a) through (d) until the desired degree of decaffeination has been achieved.

2. Process according to claim 1, wherein volatiles are stripped from the tea extract prior to step (a), and are recombined with the extract when the process has been completed.

3. Process according to claim 2, wherein following addition of volatiles to the decaffeinated tea extract, said extract is dried.

4. Process according to claim 1, wherein the extract is cooled in step (a) to a temperature between about 0° C. and about 15° C.

5. Process according to claim 1, wherein the extract is concentrated, prior to step (a), to contain from about 5% to about 25% by weight solids.

6. Process according to claim 1, where in step (c), the caffeine is removed from the insolubles phase by contact with a water-immiscible fatty material.

7. Process according to claim 1, where in step (c), the caffeine is removed from the insolubles phase by contact with a chlorinated hydrocarbon.

8. Process according to claim 1, wherein the decaffeinated tannins are oxidized prior to their addition to the solubles phase in step (d).

9. Process according to claim 1, wherein the last-added tannins are added in an amount such that the solids content of the decaffeinated extract is substantially the same as that of the concentrated extract prior to decaffeination.

10. Process for decaffeinating a tea extract which contains caffeine and tannins capable of complexing with caffeine and from which volatiles have been removed, comprising:
(a) cooling said extract sufficiently to form
(i) an aqueous solubles phase containing cold-water soluble components of the cooled extract, including a portion of the caffeine, and
(ii) an insolubles phase containing a cold-water-insoluble complex of tannins with another portion of the caffeine;
(b) separating the solubles phase from the insolubles phase;
(c) treating the insolubles phase to remove caffeine therefrom;
(d) cooling the decaffeinated insolubles phase to form a cold-water-insoluble decaffeinated tannin precipitate and a solution of cold-water-soluble tannins;
(e) separating said decaffeinated tannin precipitate from the solution of cold-water-soluble tannins;
(f) mixing an aliquot of decaffeinated tannin precipitate from step (e) with aqueous tea extract, cooling said mixture to precipitate tannins-caffeine complex therefrom and separating the precipitate from the supernatant;
(g) mixing a further aliquot of decaffeinated tannin precipitate from step (e) with the supernatant from step (f), cooling said mixture to precipitate tannins-caffeine complex therefrom and separating the precipitate from the supernatant;
(h) adding cold-water-soluble tannins from step (e) to the supernatant from step (g) and restoring volatiles thereto;
(i) drying the volatile-containing, decaffeinated extract.

11. Process according to claim 10, wherein following step (g), a further aliquot of decaffeinated tanning precipitate from step (e) is mixed with the supernatant from step (g), the mixture is cooled to precipitate tannins-caffeine complex therefrom and the precipitate is separated from the resultant supernatant; and in step (h) cold-water-soluble tannins from step (e) and volatiles are added to said resultant supernatant.

12. Process according to claim 10, wherein following step (g), one or more additional stages of decaffeination of the supernatant from step (g) is carried out by addition of decaffeinated tannins precipitate and separation of the resultant tannins-caffeine complex; and in step (h) cold-water-soluble tannins from step (e) and volatiles are added to the last decaffeinated supernatant.

13. Process for decaffeinating a tea extract which contains caffeine and tannins capable of complexing with caffeine comprising:
(a) cooling said extract sufficiently to form
(i) an aqueous solubles phase containing cold-water soluble components of the cooled extract, including a portion of the caffeine, and
(ii) an insolubles phase containing a cold-water-insoluble complex of tannins with another portion of the caffeine;
(b) separating the solubles phase from the insolubles phase;
(c) treating the insolubles phase to remove caffeine therefrom and form a decaffeinated insolubles phase;
(d) cooling the decaffeinated insolubles phase to form a cold-water-insoluble decaffeinated tannin precipitate and a solution of cold-water-soluble tannins;
(e) separating the decaffeinated tannin precipitate from the solution of cold-water-soluble tannins;
(f) mixing the separated decaffeinated tannin precipitate with the partially decaffeinated solubles phase of step (b);
(g) cooling the mixture to precipitate a further tannins-caffeine complex;
(h) separating the precipitate from the supernatant;
(i) decaffeinating the tannins-caffeine complex precipitate and returning the decaffeinated tannins to the supernatant; and
(j) adding the solution of cold-water soluble tannins from step (d) of the supernatant.

* * * * *